April 19, 1960 G. R. SINCLAIR 2,933,272
DECELERATION PARACHUTE RETRACTION SYSTEM
Filed March 16, 1959 3 Sheets-Sheet 1

INVENTOR.
GORDON R. SINCLAIR
BY
ATTORNEYS

April 19, 1960 G. R. SINCLAIR 2,933,272
DECELERATION PARACHUTE RETRACTION SYSTEM
Filed March 16, 1959 3 Sheets-Sheet 2

INVENTOR.
GORDON R. SINCLAIR
BY
ATTORNEYS

April 19, 1960 G. R. SINCLAIR 2,933,272
DECELERATION PARACHUTE RETRACTION SYSTEM
Filed March 16, 1959 3 Sheets-Sheet 3
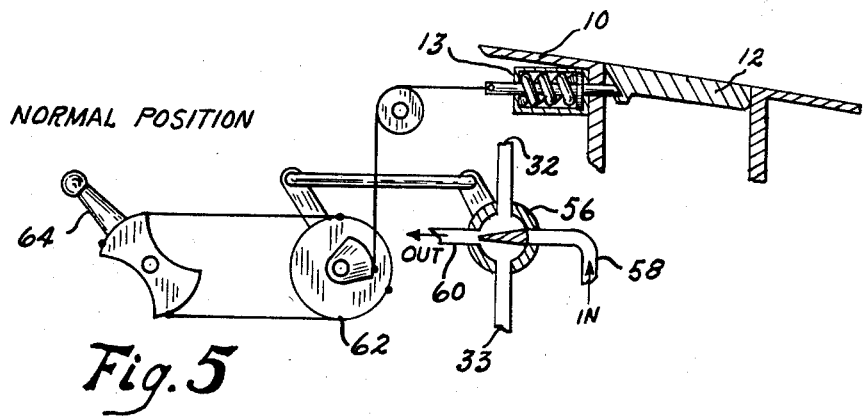
Fig. 5 NORMAL POSITION
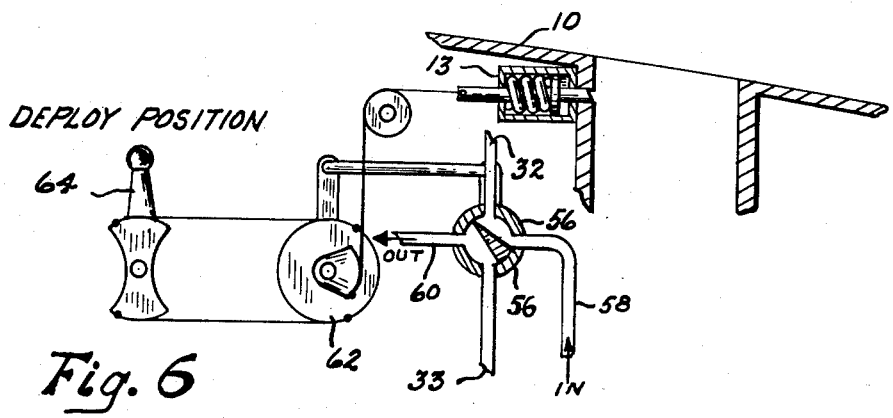
Fig. 6 DEPLOY POSITION
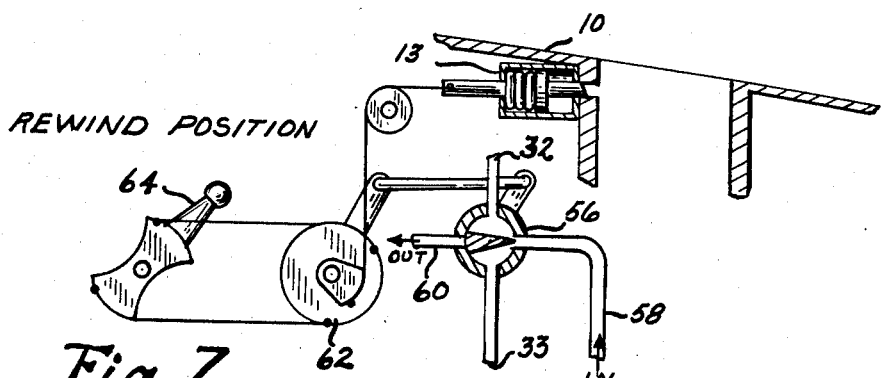
Fig. 7 REWIND POSITION
INVENTOR.
GORDON R. SINCLAIR
BY
ATTORNEYS

United States Patent Office 2,933,272
Patented Apr. 19, 1960

2,933,272
DECELERATION PARACHUTE RETRACTION SYSTEM

Gordon R. Sinclair, Fallston, Md., assignor to the United States of America as represented by the Secretary of the United States Air Force Application March 16, 1959, Serial No. 799,827

5 Claims. (Cl. 244—113)

This invention relates to a means for retracting a deceleration, or drag parachute now commonly used as an assist in decelerating a high speed airplane in the landing operation.

The present practice is to fold the parachute by hand, stow it in the plane near the tail with a small pilot chute attached and fasten it to the fuselage through a releasing device under control of the pilot. After deployment, which is done when the plane touches the runway, and when the speed of the plane is reduced to about ten miles an hour, the pilot releases the chute and it is then recovered by a ground crew, inspected, repaired if necessary, folded and stowed for further use. If the pilot does not release the chute in time it is dragged on the ground and frequently damaged. If the wind is blowing when the chute is released it may become entangled with the plane and interfere with the landing operation or endanger a following plane. In any event the present use requires the services of a ground crew for recovery of the chute, folding and stowing it for another run.

It is an object of this invention to overcome the disadvantage of the present system by providing a means for retracting the parachute automatically, after deployment by the pilot. Retraction would commence when the speed of the plane reduces to approximately 25 miles per hour and would be complete before the plane comes to a stop. This would prevent damage to the parachute by dragging, or being blown by the wind, on the runway. It would prevent possible entanglement with the landing plane or with a following plane and would make unnecessary the employment of a ground crew for recovery of the chute and for repacking and stowing in the plane.

This improvement would be accomplished by the use of a series of fingers, hydraulically or pneumatically operated, which would successively fold the riser, shrouds and canopy of the chute into a package similar to that now employed by the hand operation.

The above and still other objects, advantages and features of my invention will become apparent upon consideration of the following description of one embodiment thereof, especially when taken in conjunction with the accompanying drawings, in which:

Fig. 5 is a schematic view showing the controls in the normal position;

Fig. 6 is a schematic view showing the controls in the deploy position; and

Fig. 7 is a schematic view showing the controls in the rewind position.

Figure 1:
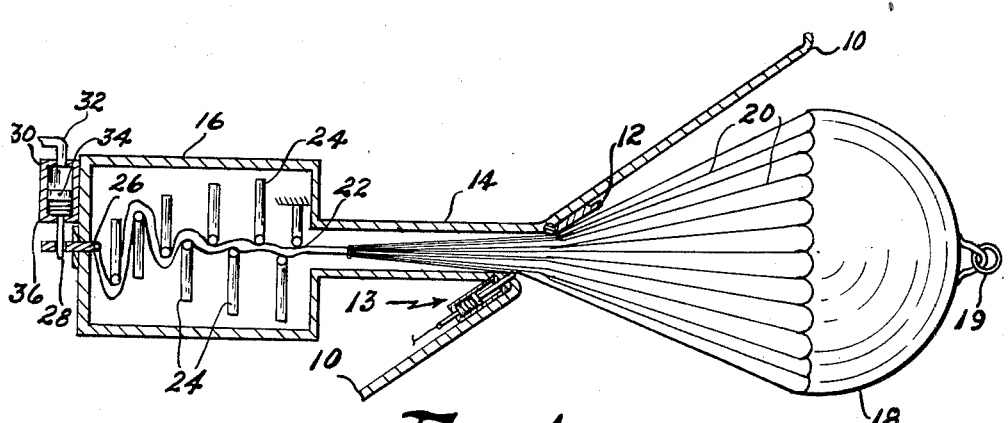
Fig. 1 is a schematic view partly in section showing the parachute partly retracted.
Figure 2:
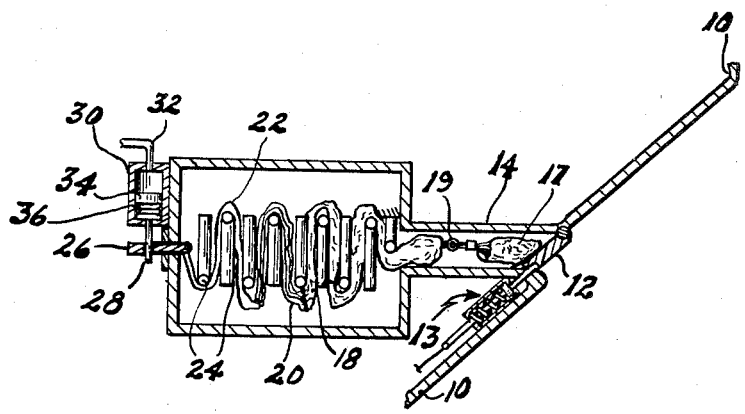
Fig. 2 is a schematic drawing partly in section showing the parachute fully retracted and folded.
Figure 3:
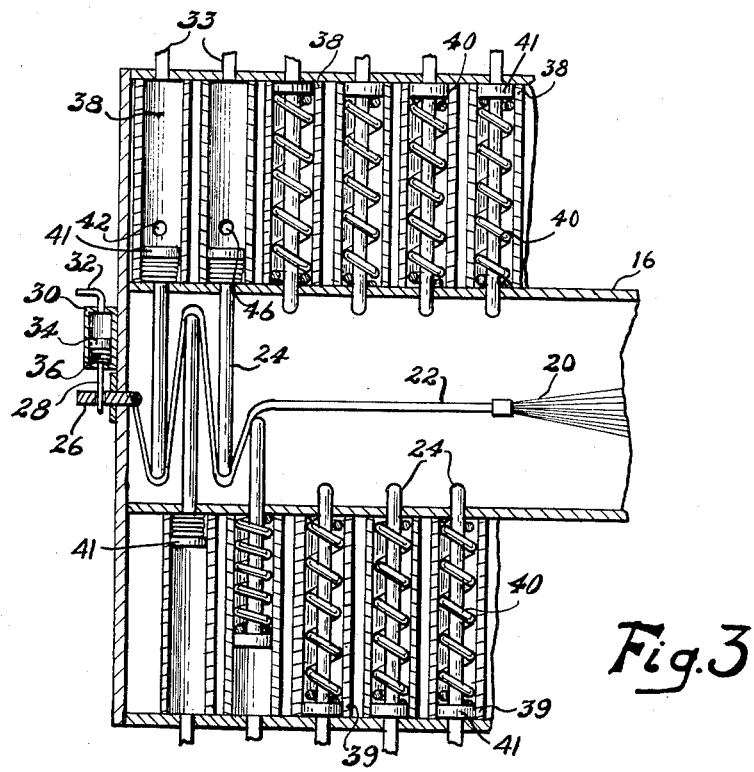
Fig. 3 is a view in section showing the arrangement of the fingers and the hydraulic cylinders.
Figure 4:
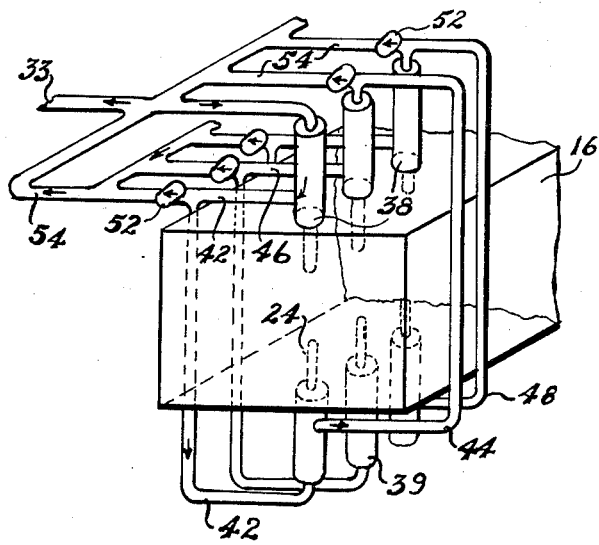
Fig. 4 is a schematic view showing the hydraulic connection between cylinders.

In the figures, 10 represents the fuselage or skin of an airplane, 12 a door held in closed position by a latch 13 under control of the pilot. A tube, or conduit 14 leads from the door to a parachute housing 16 of a size to contain a folded parachute, its shrouds and riser shown as 18, 20 and 22 respectively. A ring 19 is shown in the top of the parachute for connecting a pilot chute 17 and fingers 24 are shown for folding the riser, shrouds and canopy of the parachute. A riser fitting 26 is shown made fast to the said housing 16 by attachment pin 28 which is part of piston 34 acting in cylinder 30. A pipe, or hydraulic or pneumatic line 32 connects said cylinder 30 to a control valve 56 shown in Figs. 5, 6 and 7. When a pilot's control handle 64 is in the normal position as shown in Fig. 5, the pressure line 58 from the plane's hydraulic system is cut off from cylinder 30 and spring 36 in said cylinder forces the piston 34 up disengaging pin 28 from the riser fitting 26, thus freeing the parachute so that it will escape in case of accidental deployment. With the pilot's control handle 64 in deploy position, as shown in Fig. 6, a control quadrant 62 operates through a cord to withdraw a pin in latch 13 so that the door 12 may be forced open by the elastic pressure of the folded drag parachute 18 and the pilot chute 17. When the door opens the pilot chute 17 is caught in the air stream and pulls the main drag chute with it. At the same instant the control valve opens the pressure line 58 to the hydraulic line 32 thus forcing piston 34 down against the pressure of spring 36 and pin 28 in engagement with riser fitting 26, connecting the drag chute to the fuselage through the housing 16. When the said pilot's control handle 64 is moved to the rewind position as in Fig. 7, the pressure line 58 is connected through the control valve 56 to both hydraulic lines 32 and 33, thus keeping pin 28 engaged in riser fitting 26 and admitting pressure to the top of the first finger cylinder 38. The pressure is so adjusted as to overcome the tension of springs 40 and the drag of the parachute when the speed of the plane has been reduced to approximately 25 miles per hour. It is only necessary for the pilot to throw the control handle 64 to the rewind position after the parachute has been deployed and the rewind operation will automatically commence when the plane has been slowed to the predetermined speed and will be complete before the plane stops. The riser 22, the shrouds 20 and the canopy 18 of the drag parachute will be folded in that order by the successive action of the two rows of cylinders 38 and 39. When the control valve 56 has been put in the rewind position pressure is admitted through line 33 to the top of the first cylinder of row 38, and the piston 41 is driven to the bottom, uncovering a port connected to line 42 running to the top of the first cylinder of row 39. The pressure thus admitted drives the piston 41 of the first cylinder of row 39 to the bottom of said cylinder uncovering a port connecting to line 44 which leads to the top of the second cylinder in row 38, driving the piston of said cylinder to the bottom and uncovering a port connected to line 46 which leads to the top of the second cylinder 39. This action continues successively through as many cylinders as may be necessary to completely fold the parachute. Since the cylinders in row 38 are staggered or offset from the cylinders in row 39, as the piston 41 in each cylinder is successively forced down the fingers 24 fold the riser 22, the shroud 20 and finally the canopy 18 of the parachute into a package of the same shape and size as the present hand folded chute. One way stop valves 52 in the lines 54 prevent pressure from line 33 entering the cylinders at the top of each which would cause all cylinders to operate at once instead of the successive action which follows by sequentially connecting the bottom of each cylinder to the top of the next cylinder in the opposite row.

When the handle 64 is returned to normal position, as in Fig. 5, the quadrant 62 releases tension on the cord leading to the pin in latch 13 and the spring in said latch forces the pin to closed position. The valve 56 closes the entrance to pressure line 58 and opens lines 32 and 33 to the return line 60 permitting spring 36 in riser attachment cylinder 30 to disengage riser attachment pin 28 from the riser fitting 26 thus leaving the chute free to escape in case of accidental deployment. At the same time the springs 40 in finger sylinders 38 and 39 force the hydraulic fluid back through the one way valves into the return lines 54 into line 33 and thus back through the valve 56 to the return line 60. This action withdraws the fingers 24 from the folds in the parachute and leaves it free for deployment or escape.

It is apparent from the foregoing description and the drawings that this invention accomplishes the purposes for which it was designed in a novel manner. The use of the hydraulic system commonly installed on planes simplifies the installation of the retraction system and the regulation of the pressure to the retracting cylinders so as to exert sufficient force to overcome the drag of the deceleration parachute when the speed of the plane has been reduced to a predetermined level simplifies the duties of the pilot. This is an important feature since the pilot has many things to do in landing a high speed jet plane. With this feature of the invention in use he does not have to remember to throw the control handle to rewind when the speed of the plane has been reduced to a predetermined speed, such as 25 miles per hour, but he can throw the handle to rewind any time after the parachute has been deployed and turn his attention to other matters, knowing that retraction will commence automatically when the speed has been reduced to the said 25 miles per hour.

What I claim is:

1. In a deceleration parachute retraction system of the type which is mounted in the fuselage of an airplane, the combination of a housing secured within a fuselage, a parachute detachably held in said housing, a door through said fuselage, a passage between said door and said housing, a series of hydraulic cylinders mounted on said housing, one half of said cylinders being positioned on one side of said housing and the other half of said cylinders being positioned on the opposite side, the cylinders on said one side being staggered with relation to the cylinders on the opposite side, a piston in each of said cylinders and a finger attached to each of said pistons, said fingers being arranged to move into said housing, means biasing said fingers against such movement, means for sequentially applying a source of pressure to said pistons to move said fingers into contact with said parachute in said housing, and manually operated means for releasing said pressure.

2. A system as defined in claim 1 and further including latch means for said door, said latch means being connected to said manually operated means and being engaged when the latter is operated to relieve said pressure.

3. In a deceleration parachute retraction system of the type which is mounted in the fuselage of an airplane, the combination of a housing secured within a fuselage, a parachute detachably held in said housing, a door through said fuselage, a passage between said door and said housing, a series of hydraulic cylinders mounted on said housing, one half of said cylinders being positioned on one side of said housing and the other half of said cylinders being positioned on the opposite side, the cylinders on said one side being staggered with relation to the cylinders on the opposite side, a piston in each of said cylinders and a finger attached to each of said pistons, said fingers being arranged to move into said housing, means biasing said fingers against such movement, means for sequentially applying force to said pistons to move said fingers into contact with said parachute in said housing, said latter means consisting of a source of pressure connected to the first cylinder on one side of said housing, a port connecting said first cylinder to a first cylinder in the opposite row of cylinders, said port being open only when the piston in said first cylinder on said one side moves its attached finger into the housing, each of the remaining cylinders having an identical piston-controlled port connected to the next cylinder in the staggered arrangement, and manually operated means for releasing said pressure.

4. In a deceleration parachute retraction system of the type which is mounted in the fuselage of an airplane, the combination of a housing secured within a fuselage, a parachute detachably held in said housing, a door through said fuselage, a passage between said door and said housing, a series of hydraulic cylinders mounted on said housing, one half of said cylinders being positioned on one side of said housing and the other half of said cylinders being positioned on the opposite side, the cylinders on said one side being staggered with relation to the cylinders on the opposite side, a piston in each of said cylinders and a finger attached to each of said pistons, said fingers being arranged to move into said housing, means biasing said fingers against such movement, means for sequentially applying force to said pistons to move said fingers into contact with said parachute in said housing, said latter means comprising a source of pressure connected to the first cylinder on one side of said housing, a port connecting said first cylinder to a first cylinder in the opposite row of cylinders, said port being open only when the piston in said first cylinder on said one side moves its attached finger into said housing, each of the remaining cylinders having an identical piston-controlled port connected to the next cylinder in the staggered arrangement, and manually operated means for releasing said pressure, said manually operated means including control valve means between the pressure source and the first-named cylinder, said valve means serving to connect all of said cylinders simultaneously to exhaust upon shutting off the pressure source from said first-named cylinder.

5. A system as defined in claim 4 and further including latch means for said door, said latch means being connected to said manually operated means and being engaged when the latter is operated to relieve said pressure.

No references cited.